US007927091B2

(12) United States Patent
Revol

(10) Patent No.: US 7,927,091 B2
(45) Date of Patent: Apr. 19, 2011

(54) DEVICE FOR FILLING A MOULD WITH A POWDER OR A MIXTURE OF POWDERS

(75) Inventor: Stephane Revol, Francheville (FR)

(73) Assignees: Commissariat a l'Energie Atomique, Paris (FR); Federal Mogul Operations France SAS, Saint Jean de la Ruelle (FR)

( * ) Notice: Subject to any disclaimer, the term of this patent is extended or adjusted under 35 U.S.C. 154(b) by 326 days.

(21) Appl. No.: 10/579,328

(22) PCT Filed: Nov. 25, 2004

(86) PCT No.: PCT/FR2004/050618

§ 371 (c)(1),
(2), (4) Date: May 15, 2006

(87) PCT Pub. No.: WO2005/051576

PCT Pub. Date: Jun. 9, 2005

(65) Prior Publication Data

US 2007/0071632 A1 Mar. 29, 2007

(30) Foreign Application Priority Data

Nov. 28, 2003 (FR) ..................................... 03 50933

(51) Int. Cl.
*B29C 67/08* (2006.01)

(52) U.S. Cl. ........ 425/258; 425/256; 425/425; 425/430; 425/434; 425/447; 264/121; 264/437; 141/67; 141/286

(58) Field of Classification Search .................... 425/78, 425/79, 405.1, 405.2, 447, 253, 256, 258, 425/346, 348 S, 425, 429, 430, 434; 264/109, 121, 437; 141/67, 286, 630
See application file for complete search history.

(56) References Cited

U.S. PATENT DOCUMENTS

| | | | | |
|---|---|---|---|---|
| 2,447,434 | A * | 8/1948 | Schwarzkopf | 419/68 |
| 2,611,685 | A * | 9/1952 | Yoder | 422/143 |
| 3,647,333 | A * | 3/1972 | Smith | 425/78 |
| 3,829,261 | A * | 8/1974 | Larsson et al. | 425/78 |
| 3,892,506 | A * | 7/1975 | Dann et al. | 425/78 |
| 4,255,103 | A * | 3/1981 | Rozmus | 425/78 |
| 4,397,423 | A | 8/1983 | Beaver et al. | |
| 4,437,613 | A | 3/1984 | Olson | |
| 4,496,299 | A * | 1/1985 | Pettersson | 425/405.2 |
| 4,591,324 | A * | 5/1986 | Kubota | 425/222 |
| 4,756,680 | A * | 7/1988 | Ishii | 425/78 |

(Continued)

FOREIGN PATENT DOCUMENTS

DE 24 50 736 2/1976

(Continued)

*Primary Examiner* — Joseph S Del Sole
*Assistant Examiner* — Seyed Masoud Malekzadeh
(74) *Attorney, Agent, or Firm* — Oblon, Spivak, McClelland, Maier & Neustadt, L.L.P.

(57) ABSTRACT

A device for filling at least one mold with at least one powder. The device includes a mechanism to add at least one powder, at least one mechanism to eject the powder added into the device, in the form of a layer, and at least one deflector capable of locally intercepting at least part of the powder ejected in the form of a layer and redirecting the locally intercepted powder towards a determined location in the mold.

16 Claims, 4 Drawing Sheets

U.S. PATENT DOCUMENTS

| | | | | | |
|---|---|---|---|---|---|
| 4,841,884 | A | * | 6/1989 | Engstrom et al. | 110/298 |
| 4,859,073 | A | * | 8/1989 | Howseman, Jr. et al. | 366/195 |
| 4,940,568 | A | * | 7/1990 | Hoyler et al. | 117/214 |
| 4,970,804 | A | * | 11/1990 | Huttlin | 34/589 |
| 5,137,663 | A | * | 8/1992 | Conaway | 264/36.15 |
| 5,296,202 | A | * | 3/1994 | Souers et al. | 422/219 |
| 5,498,146 | A | * | 3/1996 | Ritter et al. | 425/78 |
| 5,647,410 | A | | 7/1997 | Nakagawa et al. | |
| 5,735,319 | A | * | 4/1998 | McNamara et al. | 141/286 |
| 5,747,073 | A | * | 5/1998 | Pettersson et al. | 425/78 |
| 5,881,357 | A | | 3/1999 | Takemoto et al. | |
| 5,885,625 | A | | 3/1999 | Beane et al. | |
| 5,897,826 | A | | 4/1999 | Lashmore et al. | |
| 6,402,500 | B1 | * | 6/2002 | Zahrah et al. | 425/448 |

FOREIGN PATENT DOCUMENTS

| | | | |
|---|---|---|---|
| EP | 0 162 463 | | 11/1985 |
| EP | 1 083 125 | | 3/2001 |
| FR | 2 234 045 | | 1/1975 |
| FR | 2 766 386 | | 1/1999 |
| JP | 4-97964 | * | 3/1992 |
| JP | 2000 119704 | | 4/2000 |
| WO | 01 26846 | | 4/2001 |
| WO | 01 56726 | | 8/2001 |

* cited by examiner

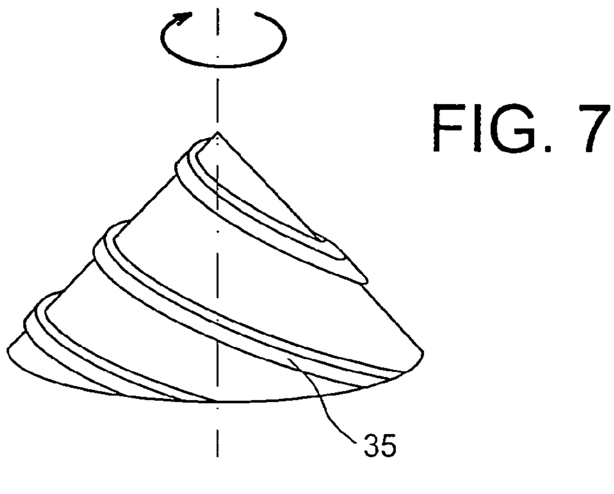
FIG. 7
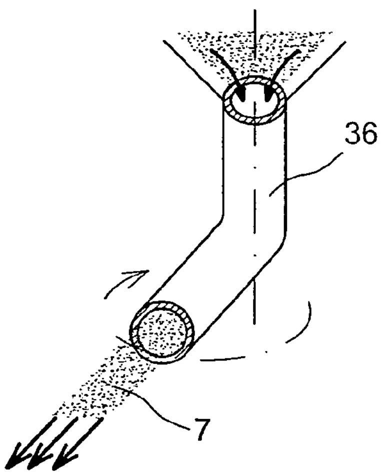
FIG. 8
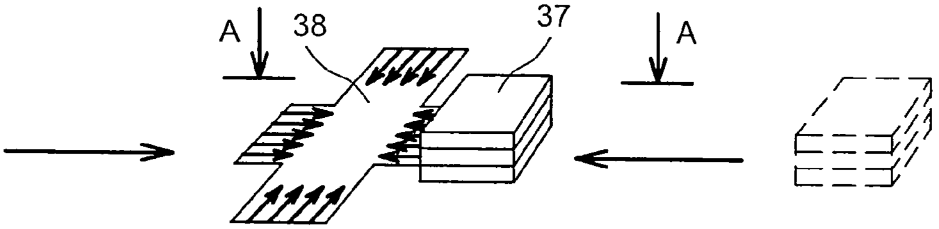
FIG. 9
FIG. 10
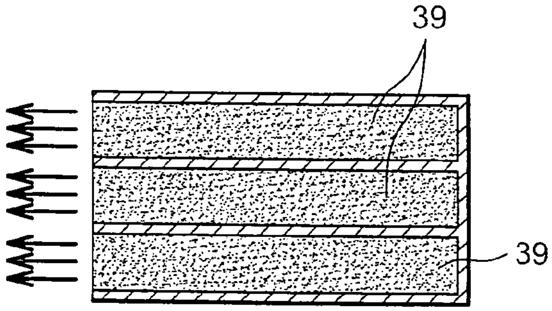

DEVICE FOR FILLING A MOULD WITH A POWDER OR A MIXTURE OF POWDERS

TECHNICAL DOMAIN

The invention relates to a device for filling a mould, particularly a compression mould, with a powder or mix of powders in very wide ranges of materials such as construction materials, pharmaceuticals, food processing, nuclear ceramics, cement, sintered metallic powders.

STATE OF PRIOR ART

The domain of the invention relates to pattern cavity filling systems with finely divided materials to facilitate their compression. In this domain, solutions are searched for so as to deposit or transport powder into a compression mould, in a controlled, uniform and fast manner. In particular, the purpose is controlled and modulable filling of a mould for uniaxial compression, or hot isostatic compression, or sintering with a mix of powders.

In powder metallurgy, many components are made by compression of metallic powders obtained by thermochemical means or atomisation. Powders are deposited in a cavity or pattern cavity of a die in the shape that the component is to have, and powders are then compressed under very high pressures. The pellets obtained are then sintered, in other words heated to very high temperatures so that the compressed powders are bonded together into a compact mass with sufficiently good mechanical properties to form a solid.

There are many methods for filling the compression pattern cavity with powders.

One of the most frequently used methods is volumetric filling of a pattern cavity by gravity. The disadvantage of this technique is that it cannot be used to control filling of the cavity. Consequently, large variations in powder weight are observed in the cavity, with non-uniform distributions of powders in the cavity.

Other methods consist of fluidising the powder. Many fluidised systems are now available and are marketed. For some, the powder may be fluidised in the powder storage device (see documents [1], [2], [3]) or directly in the cavity (see document [4]). However, in both cases the systems have a major common disadvantage. Fluidisation is obtained by injecting gas into the filling system. Therefore, gas flows must be managed very precisely and this creates problems in terms of robustness of the system. Furthermore, the gas in the powder can initiate instability. Therefore, the use of gas leads to a powder deposit with advantages but for which the level of control remains low.

There are other systems that provide partial improvements to the problem of filling a cavity with powder. For example, some systems compact powder by pressure waves in the shoe (see document [5]), while others use a shoe with cross displacement (see document [6]) or a shoe outputting pre-compacted powder (see document [7]).

However, these techniques neither enable precise filling of the cavity in space, nor uniform filling of the cavity, particularly in the case of complex moulds for powders that will subsequently be significantly compressed. Control of the powder flow in time and in space remains poor in these systems.

PRESENTATION OF THE INVENTION

The purpose of the invention is to feed a device without these disadvantages. This purpose is achieved by a device for filling at least one mould with at least one powder, characterised in that it comprises:

means for adding at least one powder, at least one means for ejecting the powder added into the device, in the form of a layer, at least one deflector capable of locally intercepting at least part of the said powder ejected in the form of a layer and redirecting it towards a determined location in the mould.

In other words, the device according to the invention provides a means for projecting a powder in form of a layer in suspension that is intercepted by deflectors placed on the path of the powder and positioned such that the intercepted powder drops at a precise point in the mould to be filled.

Advantageously, the device may include several means for ejecting the powder added into the device in the form of a layer, each of these means being designed to distribute a different powder.

A "powder layer" means a set of grains that occupy a volume for which the thickness is small compared with its surface dimensions. This set may form a plane portion, or it may be concave, convex or any other shape.

Advantageously, the deflector can be oriented.

Advantageously, the deflector is mobile. Therefore, for example, the deflector can move vertically and can rotate on itself.

For example, the deflector may be a plane part, or it may be convex, or it may comprise a helical portion, etc.

According to one particular embodiment, the means for ejecting the powder in the form of a layer is a rotary device.

According to a first case, the shape of the rotary device is advantageously chosen to be a disk, a cone or a bowl. Advantageously, the device rotates around an axis of rotation located at the centre of symmetry of the device.

Advantageously, the rotating device comprises at least one rib. In this case, the rib will advantageously be placed along the radius of the said disk, cone or bowl. Note that the shape of the ribs is the same as the deflectors, in other words they may be plane, concave, convex, helical, etc.

The purpose of the ribs present on the disk, cone or bowl is to make it easier for the powder to fly off and to control it. It will be possible to use a rough coating or a coating with micro-grooves instead of ribs, so as to transfer the quantity of energy necessary to form the powder layer.

Advantageously, the at least one rib is rotatable.

According to a second case, the rotating device comprises a lower part and an upper part spaced from each other by a determined distance, the upper part having an orifice through which the powder enters and the powder being able to escape through the space between the two parts.

According to a third case, the rotating device is an element with a powder inlet and a powder outlet, the said element being arranged such that the inertia of the powder leaving the outlet is sufficiently high so that the powder is projected outside the element. Advantageously, this element is a curved tube. Advantageously, the axis of rotation of this rotating device is concomitent with the part of the tube in which the powder inlet is located.

According to another particular embodiment, the means for adding at least one powder are at least one receptacle comprising a powder inlet and a powder outlet, and the means for ejecting the powder in the form of a layer is a means used to quickly move the at least one receptacle and to stop it suddenly so that the powder contained in it is sprayed outside the receptacle by inertia. Note that the powder inlet may correspond to the powder outlet.

If the means for ejecting the powder is a rotating device, the at least one deflector is advantageously placed in parallel with the rotation axis about which the means rotates to eject the powder in the form of a layer.

Advantageously, the at least one deflector may also be placed so as to be perpendicular to the median ejection plane of the powder layer, and the means for ejecting the powder may be a rotating or non rotating device.

Advantageously, the at least one deflector is a part of the internal wall of the device.

Advantageously, the shape of the at least one deflector is adapted to the shape of the determined location of the mould to be filled. In other words, the at least one deflector is advantageously placed above the cavity that it is to fill, and its shape is the same as or is similar to the shape of the said cavity.

The device according to the invention has many advantages.

Firstly, the device can be used to fill a mould quickly.

Similarly, it makes it possible to mix powders inside the device.

Filling with the powder(s) is done without needing to add a complementary quantity of gas into the system when the powder is brought into movement.

The device according to the invention provides a means for feeding each different zone of the pattern cavity with a controlled powder flow.

The result is thus a device for controlling the powder flow feeding each of the chosen zones of the mould or the cavity in time and in space.

Thus, with this device it becomes possible to create and deposit a mix of powders for which the different components have very different densities, inside the mould without destabilising it.

In the same way as different compositions and flows of powders can be controlled in space, it is possible to modulate the composition of the mix and the apparent density of the deposited powders as a function of the height of the compacted part to be achieved. In particular, the horizontality and the planeness of deposited powders can be controlled.

Furthermore, the device does not require the use of a powder with good flowability. No flows take place through a small diameter pipe. Therefore, the choice of powders is broadened.

The invention makes grinding possible by impact of powders when the granulated powders are being added into the system, which is very useful for carbides and nuclear materials.

With this device, it becomes possible to add an additive in one or several chosen zones of the cavity, for example the additive making it possible to improve future compaction.

BRIEF DESCRIPTION OF THE FIGURES

Other special features and advantages of the invention will become clearer after reading a preferred embodiment of the invention with reference to the appended figures, wherein:

FIG. 7 shows a sectional view of a rotating device in the shape of a cone and with ribs.

FIG. 8 shows a sectional view of another example rotating device.

FIG. 9 shows another example of the filling device according to the invention.

FIG. 10 is a sectional view along the BB axis of element 37 in FIG. 9.

DETAILED PRESENTATION OF PARTICULAR EMBODIMENTS

For example, the embodiments described below apply to filling of moulds with a powder and with a mix of powders.

The filling materials used are powders intended to be formed for example by sintering, by compression, by compression-sintering or by hot isostatic compression. For example, it includes metallic, ceramic powders, or mixes of them.

These powders must satisfy manufacturing requirements of the sintered object, particularly concerning the size grading, purity and compressibility. Thus, the diameter of the powders used is less than 3 mm and is preferably less than 1 mm.

The filling device according to the invention is supplied by placing doses of powders defined by volumetric or weight predosing in the said device or by adding powders through a hopper (reservoir in the form of a truncated and inverted quadrangular pyramid) with a tubular connection. For example, for reasons of size, the hopper may be inclined or placed around the periphery of the disk. It may be replaced by a worm screw, or by a tube, etc. The hopper-body connection of the device is usually controlled by a closer, which also provides a means for metering quantities of powder added onto the tray and controlling the time of the addition.

Figure 1:
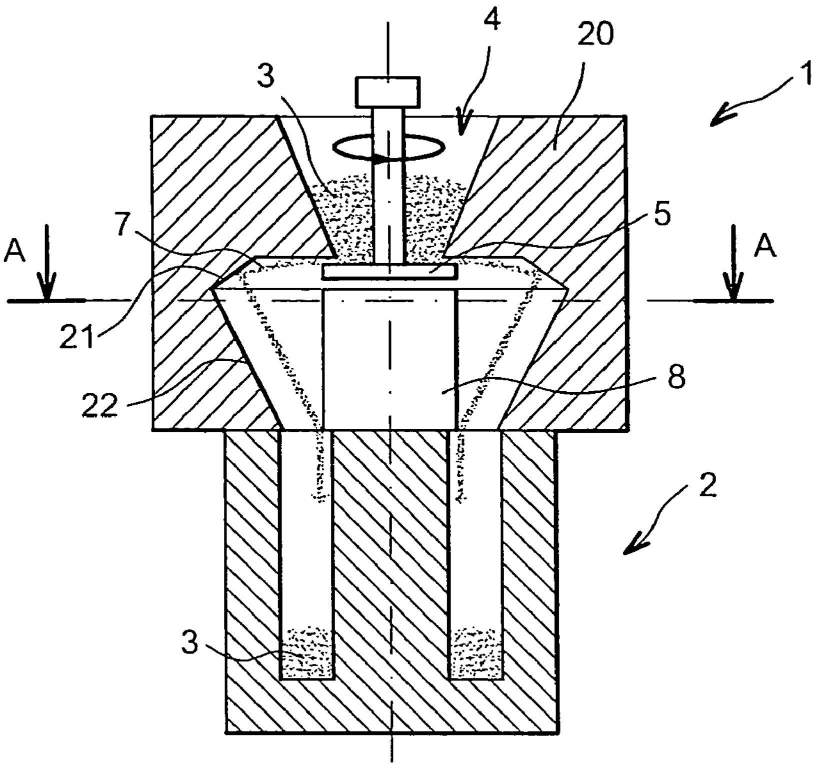
FIG. 1 shows a sectional view of a particular example of the filling device according to the invention.
Figure 2:
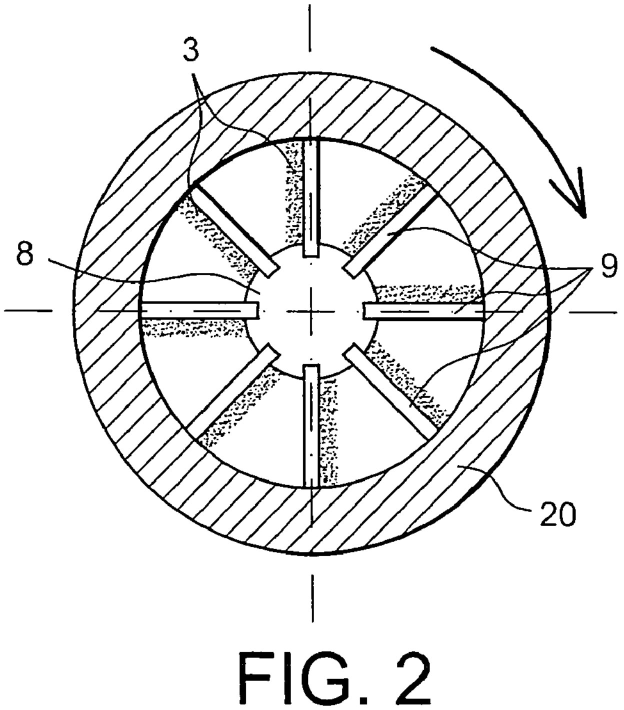
FIG. 2 shows a sectional view of FIG. 1 along the AA axis.

According to a first example shown in FIGS. 1 and 2, the objective is to fill a mould 2 using the device 1 according to the invention. The powder 3 is contained in a hopper 4 formed in the upper part of a body 20 of the device. It drops after it enters onto a tray 5, rotating about a central axis 6, located immediately below the hopper 4. In this example, the tray 5 is disk-shaped. The tray 5 that is rotating quickly, ejects the powder 3 in the form of a homogeneous and almost horizontal layer 7, for which the average direction is within an angle of plus or minus 90° from the horizontal. As shown in FIG. 1, the layer of powder 7 ejected by the tray 5, strikes the wall 21 of the body of the device: this wall acts like a deflector. The wall 22 is located lower than the wall 21 and may also act as a deflector.

Once the powder layer 7 has been deviated by the wall 21, it then comes into contact with deflectors 9 that are fixed, radial and vertical with respect to the rotating tray 5. In this example, the deflectors 9 are fixed to a central element 8 in the shape of a cylinder. The powder 3 is thus distributed into the mould 2 or the cavity below the deflectors 9. Note that the element 8 and the deflectors 9 are fixed; only the tray 5 is rotating.

After a first reflection on the body, the layer can be redirected towards other walls (like the walls of the body or the central element) before being reflected on the deflectors 9. All these walls form a set of deflectors that control the flow of grains.

The rotation speed of the rotating tray is 100 to 10000 revolutions per minute depending on the powder and the energy to be supplied to the powder. Advantageously, this speed is between 100 and 5000 revolutions per minutes.

In FIG. 2, since the deflectors are fixed and the tray is rotating in the clockwise direction in this example, it can be seen that the powder is in contact with one side of the deflectors.

Figure 3:
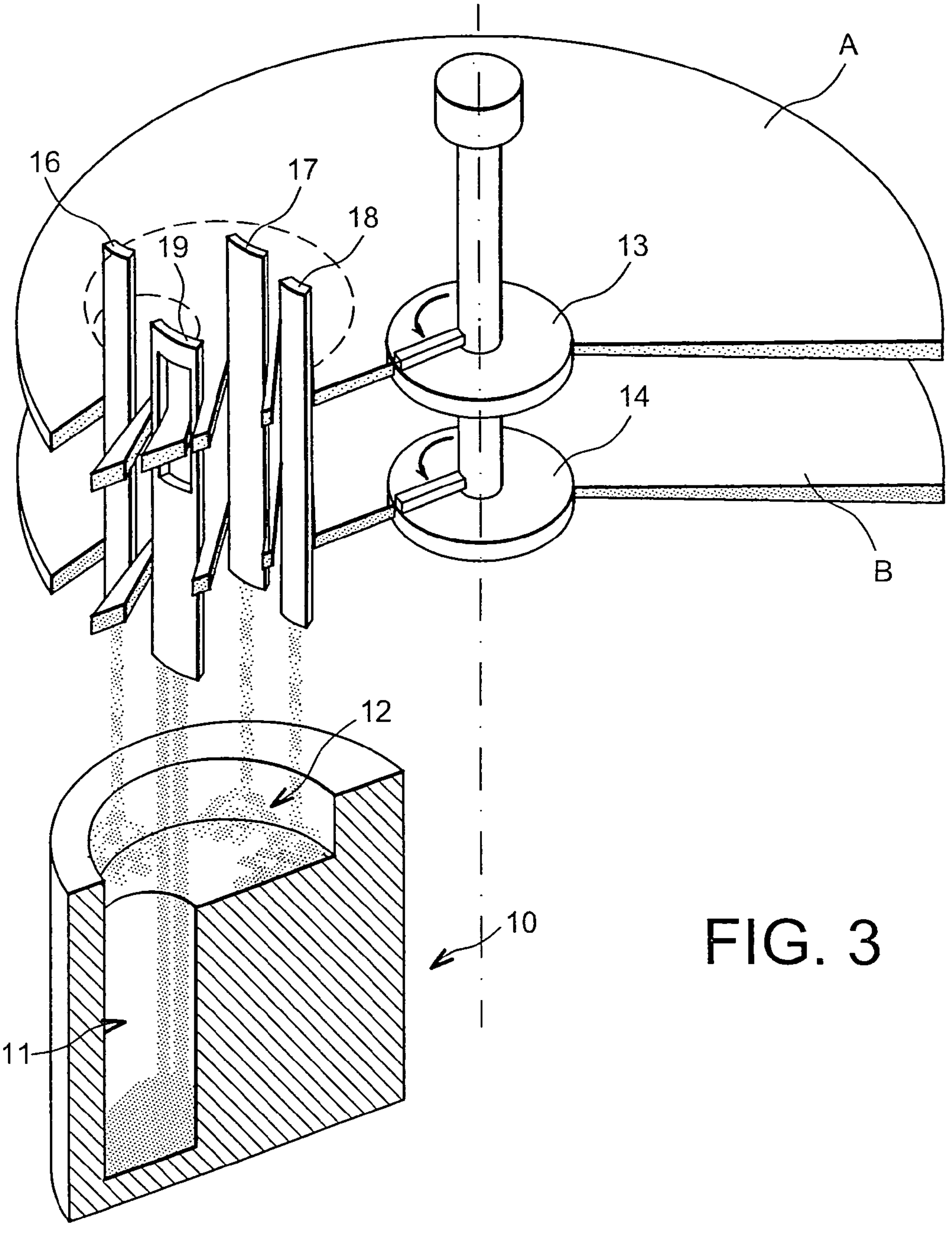
FIG. 3 shows another example of the filling device according to the invention.

According to another example, it is required to fill a mould with different depths of cavities, using different powder mixes depending on the location in the mould. FIG. 3 shows a device according to the invention composed of a set of powder deflectors capable of distributing different layers of almost horizontal powders in a controlled and modulable manner (average direction between + or −90° from the horizontal) at different locations in a mould. The mould 10 in question has two cavities: a deep and narrow cavity 11, and a shallower and wide cavity 12, the bottom of which opens up onto cavity 11.

In this example, two disks (13 and 14), rotate around a common central axis 15, and each receives a different powder in this case called powder A and powder B, that they eject in the form of an aerated powder layer with a determined thickness. The powders can be added into the disks using a hopper with two outlets or using several hoppers. It is obvious that the disks can be carried on different axes.

Four elongated deflectors with different widths are installed to be perpendicular to the rotation plane of these two rotating disks (13 and 14) on the path of powder layers A and B. There are actually three deflectors with identical shapes (16, 17 and 18) and a deflector 19 with a recess in the part in contact with the powder A. The deflectors are placed such that a precise location of the pattern cavity can be filled with powder. Since these four deflectors are flat in shape, they are placed immediately above corresponding cavities of the mould that they have to fill. Thus, these four deflectors intercept the different powder layers at determined locations corresponding to cavities of a given pattern cavity to be filled. Thus, each deflector, due to its geometry and position (which can be modified during a filling operation) participates in distribution of the powder or the different powders in a mould.

Remember that the shapes of the deflectors are varied (concave, plane, convex, helical shapes, etc.) and that the deflectors can be tilted in all directions from the plane of the tray.

The shape of each deflector has an influence on the quantity of powder that it deviates towards the pattern cavity. In FIG. 3, it can be seen that the deflector 19 is wider than the deflectors 16, 17 and 18 at the interception zone of the powder B. Therefore, the deflector 19 captures more powder B than the other deflectors and the location at which it deposits the said intercepted powder in the cavity (in other words the cavity 11) fills faster than the other cavities. The use of deflectors with different widths may be useful if it is required to fill locations of the pattern cavity with different depths.

Furthermore, it has been seen that the deflector 19 is provided with a recess at the location at which it captures the powder A, and that this recess is missing at the location at which it captures the powder B. Therefore, deflector 19 intercepts more powder A than powder B. Therefore, the cavity 11 of the cavity 10 will be enriched with powder A and it will contain traces of powder B. But the deflectors 16, 17 and 18 intercept as much powder A as powder B.

It is possible to displace the deflectors vertically while filling or to rotate them, for example so that they deviate more powder or to adapt them to a different rotation speed of the disk, which has a repercussion on the velocity of the ejected powder.

Note that the dimension of the cavity used with this device according to the invention can be as much as 200 mm.

FIG. 3 only shows a single set of deflectors and a single mould. Obviously, other sets of deflectors and corresponding moulds are present, although they are not shown. Moulds and deflectors are located at precise positions around the circumference of the rotating tray.

Powder not deviated by deflectors drops due to gravity. In FIG. 3, non-deviated powder drops to the periphery and it is recovered. In FIG. 2, all the powder is used.

Powder layers used to fill the cavities can be obtained in different ways.

For example, they may be obtained by acceleration of the powder on a rotary device (as is the case in FIGS. 1 and 3). This rotating device may be in the shape of a disk, a bowl, a cone, etc.

The nature of the rotating device may be metallic, ceramic, polymer or other. Its surface condition may vary from a polished state to a very rough state depending on the required trajectory of the powder particles.

Figure 4:
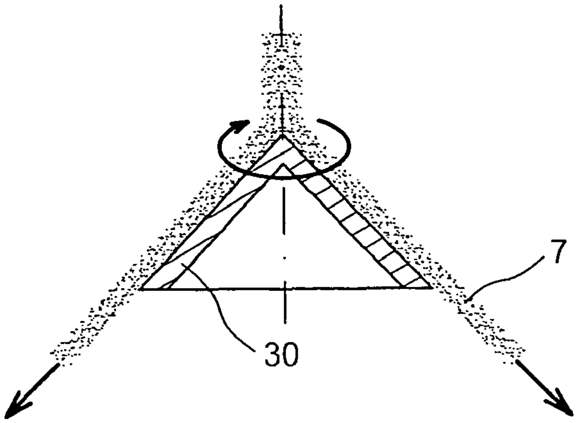
FIG. 4 shows a sectional view of an example rotating device in the shape of a cone.
Figure 5:
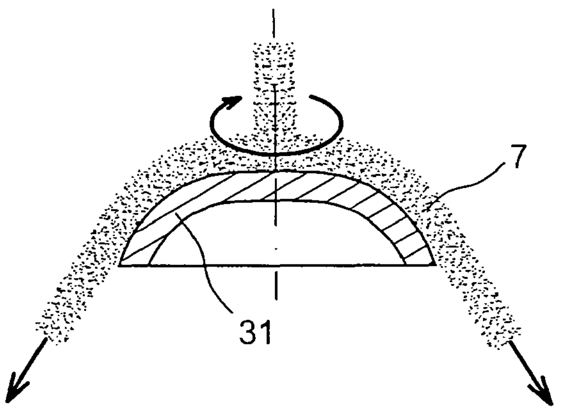
FIG. 5 shows a sectional view of an example rotating device in the shape of a bowl.

The geometry of the rotating device is not necessarily plane. The device may for example be in the shape of a cone (in other words a triangular-shaped section 30) (see FIG. 4), a bowl (circular-shaped or approximately circular-shaped section 31) (see FIG. 5) or any other form used to direct the powder layer 7.

Figure 6:
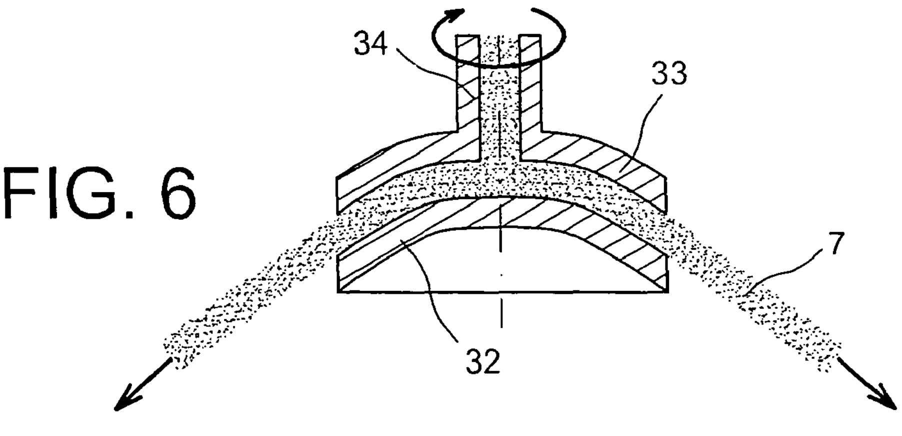
FIG. 6 shows a sectional view of another example rotating device.

If it is required to check the thickness of the powder layer in addition to forcing it out, another element can be added to the bowl or the disk. According to FIG. 6, there are two parts separated by a small distance (up to several mm), delimiting a space in which the powder can circulate: the lower part 32 is shaped like a bowl and the upper part 33 is also shaped like a bowl with a duct 34 at its centre through which the powder 7 can be entered.

The disk, the bowl or cone may include particular shapes on its surface capable of adjusting transmission of energy from the disk to the powder. These shapes may be cylinders (for example made by adding pins), half-spheres (made by local penetration of the disk) or any other shape that will influence entrainment of the powder on the disk or bowl. The disk or bowl may comprise ribs over their surface. For example, FIG. 7 shows a disk with a triangular section with helical ribs 35 starting from the vertex of the disk.

The powder layer may also be obtained by high frequency scanning of a jet. The layer is then materialization of the envelope of different trajectories of powder particles. This powder layer may be defined by a powder jet that will scan a given zone at high frequency. The whole of the scanned zone will be called a <<layer>>. One principle example is shown in FIG. 8. In this case, the powder may for example be accelerated in a cranked tube 36 by rotation of the said tube. The geometry of the said tube will determine the path of the ejected powder. In this example, the orifice of the tube describes a circular geometry. The layer of powder in this case will be symmetric about the rotation axis of the tube, in the same way as when a rotating disk or bowl is used.

The powder layer may also be obtained by acceleration of the powder contained in receptacles. According to FIG. 9, it can be seen that the powder is placed in a receptacle 37 comprising one or several compartments for which the height is small compared with its other dimensions. One of the vertical faces of the receptacle does not contain a wall or is provided with a removable wall enabling access to the compartments. This wall will be removed when it is required to eject the powder outside the receptacle. In this case, the receptacle will be accelerated in the direction of the area in which it is required to create the layer. The receptacle is suddenly blocked at a short distance from this zone 38. Under the effect of its inertia at the time of the said sudden stop, the powder is then ejected in the form of a "layer" through the opening 39 provided for this purpose (see FIG. 10). This layer may subsequently be controlled and/or calibrated by adapting the shape of the outlet opening of the receptacle. If the receptacle comprises several compartments, the layer is composed of the different powder projections initiated by each of the compartments. Advantageously, the superposed compartments are full of different powders (see FIG. 10). Thus, different parallel layers are created.

Several receptacles can also be used to get a better distribution of powder and avoid having a preferred direction. Obviously, this arrangement is attractive for powder mixes. For example, in the case in FIG. 9, four receptacles are placed on the same plane and at an equal distance from an axis marking the centre of the die to be filled. In this figure, powder ejections are symbolically shown by arrows.

Note that the deflectors and the mould to be filled are not shown in FIG. 9.

Other mechanical systems could be envisaged to create the layer. For example, the layer could be accelerated using a gas, provided that it is possible to assure that the accelerating gas does not pass through or accumulate in the mould or even the area in which the deflectors are located.

Once the mould is filled with the layer obtained according to one of these techniques, the powder(s) retained in it may for example be compressed using an uniaxial compression, consisting of agglomerating the powder or mix of powders contained in the mould, applying a high pressure to it (1 to 8 kbars).

The pellet obtained is then made mechanically strong by applying a sintering treatment to it. This corresponds to a heat treatment of the pellet at a temperature less than the melting point of the main constituent, in order to confer a significant mechanical strength on it.

BIBLIOGRAPHY

[1] Document WO 0126846, "Fluidized fillshoe system", published Apr. 19, 2002.

[2] American patent U.S. Pat. No. 5,881,357, "Method and apparatus for filling powder", filed Mar. 28, 1997.

[3] Document WO 0156726, "Powder filling method and arrangement therefor", published Aug. 09, 2001.

[4] American patent U.S. Pat. No. 5,897,826, "Pulsed pressurized powder feed system and method for uniform particulate material delivery", filed Oct. 08, 1997.

[5] Document EP 1 083 125, "Method and apparatus for packing material", filed Sep. 06, 2000.

[6] American patent U.S. Pat. No. 5,647,410, "Powder molding machine and method for filling molding materials into a die cavity thereof", filed Mar. 14, 1994.

[7] American patent U.S. Pat. No. 5,885,625, "Pressurized feed shoe apparatus for precompacting powdered materials", filed Aug. 29, 1996.

The invention claimed is:

1. A system comprising at least one mold and a device for filling the at least one mold with at least one powder, the mold having an internal volume divided into an array of several sections and the device comprising:

means for adding the at least one powder into the filling device;

at least one means for ejecting the powder added into the filling device in a form of a layer; and a plurality of deflectors placed above the mold, each of the deflectors being placed above at least one, but not all, of the sections of the internal volume of the mold, the deflectors being configured to locally intercept at least part of the powder ejected in the form of a layer and redirect locally intercepted powder towards the section of the internal volume of the mold above which each of the respective deflectors is placed, wherein the at least one means for ejecting the powder is a rotating device, and wherein at least one of the deflectors is coupled to the rotating device.

2. The system according to claim 1, wherein at least one of the deflectors is tiltable.

3. The system according to claim 1, wherein at least one of the deflectors is mobile.

4. The system according to claim 1, wherein a shape of the rotating device is a disk, a cone, or a bowl.

5. The system according to claim 4, wherein the rotating device includes at least one rib.

6. The system according to claim 5, wherein the at least one rib is orientable.

7. The system according to claim 1, wherein the rotating device comprises a lower part, an upper part, and a given space located between said lower and upper parts, the upper part including an orifice through which the powder enters and the powder is configured to escape through the given space.

8. The system according to claim 1, wherein the rotating device includes a powder inlet and a powder outlet, and is arranged such that inertia of the powder leaving the outlet is sufficiently high so that the powder is projected outside the rotating device.

9. The system according to claim 8, wherein the rotating device includes a curved tube.

10. The system according to claim 1, wherein the means for adding at least one powder includes at least one receptacle including a powder inlet and a powder outlet, and the at least one means for ejecting the powder in the form of a layer quickly moves the at least one receptacle and stops the at least one receptacle suddenly, so that the powder contained in the at least one receptacle is sprayed outside the at least one receptacle by inertia.

11. The system according to claim 1, wherein at least one of the deflectors is placed in parallel with a rotation axis about which the at least one means for ejecting rotates to eject the powder in the form of a layer.

12. The system according to claim 1, wherein at least one of the deflectors is placed perpendicular to a median ejection plane of the powder layer.

13. The system according to claim 1, wherein at least one of the deflectors is a part of an internal wall of the device.

14. The system according to claim 1, wherein at least one of the deflectors has a shape of the section of the mold above which the at least one of the deflectors is located.

15. The system according to claim 1, wherein a thickness of the layer is smaller than an opening of a cavity of the mold.

16. The system according to claim 1, wherein the rotating device ejects the powder at a direction between a horizontal and minus 90° of the horizontal.

* * * * *